United States Patent
Ding

(10) Patent No.: US 10,594,472 B2
(45) Date of Patent: Mar. 17, 2020

(54) HYBRID FULLY HOMOMORPHIC ENCRYPTION (F.H.E.) SYSTEMS

(71) Applicant: Jintai Ding, Cincinnati, OH (US)

(72) Inventor: Jintai Ding, Cincinnati, OH (US)

( * ) Notice: Subject to any disclaimer, the term of this patent is extended or adjusted under 35 U.S.C. 154(b) by 72 days.

(21) Appl. No.: 15/556,575

(22) PCT Filed: Mar. 4, 2016

(86) PCT No.: PCT/CN2016/075668
§ 371 (c)(1),
(2) Date: Sep. 7, 2017

(87) PCT Pub. No.: WO2016/141860
PCT Pub. Date: Sep. 15, 2016

(65) Prior Publication Data
US 2018/0048459 A1 Feb. 15, 2018

Related U.S. Application Data

(60) Provisional application No. 62/130,543, filed on Mar. 9, 2015.

(51) Int. Cl.
*H04L 9/00* (2006.01)
*H04L 29/08* (2006.01)
(Continued)

(52) U.S. Cl.
CPC ............ *H04L 9/008* (2013.01); *G06F 21/575* (2013.01); *H04L 9/14* (2013.01); *H04L 9/30* (2013.01);
(Continued)

(58) Field of Classification Search
CPC ......... H04L 9/008; H04L 9/3226; H04L 9/30; H04L 9/14; H04L 67/10; H04L 2209/16; G06F 21/575
(Continued)

(56) References Cited

U.S. PATENT DOCUMENTS

| | | | |
|---|---|---|---|
| 8,515,058 B1* | 8/2013 | Gentry | H04L 9/008 380/28 |
| 2003/0215093 A1* | 11/2003 | Ding | H04L 9/3093 380/255 |

(Continued)

FOREIGN PATENT DOCUMENTS

| CN | 104283669 A | 1/2015 |
|---|---|---|
| CN | 104426973 A | 3/2015 |
| WO | WO 2012-149395 A1 | 11/2012 |

OTHER PUBLICATIONS

Brakerski et al., Efficient Fully Homomorphic Encryption from (Standard) LWE, in FOCS, 2011, 43 pages.
(Continued)

*Primary Examiner* — Abu S Sholeman
(74) *Attorney, Agent, or Firm* — BakerHostetler

(57) ABSTRACT

Using a secure hardware or other form secure elements, where we securely implement the decryption and then encryption function to perform the re-encryption function, we build a hybrid fully homomorphic encryption system, where the bootstrap step is replaced the re-encryption function in the hardware module. This new hybrid system are very efficient because the re-encryption is much more efficient than the bootstrap function, which is the main bottleneck in terms of computations in FHE. In such a system, we make the system secure by making this hardware module secure using all or some of known techniques including temper proof, self-destruction and etc. This module can be controlled by either the server or the client or jointly.

10 Claims, 1 Drawing Sheet

(51) Int. Cl.
*G06F 21/57* (2013.01)
*H04L 9/14* (2006.01)
*H04L 9/30* (2006.01)
*H04L 9/32* (2006.01)

(52) U.S. Cl.
CPC ............ *H04L 9/3226* (2013.01); *H04L 67/10* (2013.01); *H04L 2209/16* (2013.01)

(58) Field of Classification Search
USPC .......................................................... 380/28
See application file for complete search history.

(56) References Cited

U.S. PATENT DOCUMENTS

| | | | |
|---|---|---|---|
| 2005/0195975 A1* | 9/2005 | Kawakita | H04L 9/0822 380/30 |
| 2008/0013716 A1* | 1/2008 | Ding | H04L 9/3093 380/30 |
| 2012/0213359 A1* | 8/2012 | Troncoso Pastoriza | H04L 9/008 380/28 |
| 2014/0095860 A1 | 4/2014 | Abdullatif et al. | |
| 2016/0350648 A1* | 12/2016 | Gilad-Bachrach | G06N 3/08 |

OTHER PUBLICATIONS

Brakerski et al., "Fully Homomorphic Encryption from Ring-LWE and Security for Key Dependent Messages", Annual Cryptology Conference, CRYPTO 2011, Advances in Cryptology, 505-524.

Eguro et al., "FPGAs for Trusted Cloud Computing" International Conference on Field-Programmable Logic and Applications, IEEE, Aug. 2012.

Gentry, "Fully homomorphic encryption using ideal lattices", Symposium on the Theory of Computer (STOC), 2009, 169-178.

Porras et al., "ZHFT, a New Multivariate Public Key Encryption Scheme", Post-Quantum Cryptograph, PQCRYPTO 2014, Lecture Notes in Computer Science, Dec. 31, 2014, 8772, 229-245.

Smart et al., "Fully Homomorphic Encryption with Relatively Small Key and Ciphertext Sizes", Public Key Cryptography—PKC 2010, Lecture Notes in Computer Science, Dec. 31, 2010, 6056, 420-443.

Van Dijk et al., "Fully Homomorphic Encryption over the Integers", EUROCRYPT 2010, LNCS 6110, 24-43.

* cited by examiner

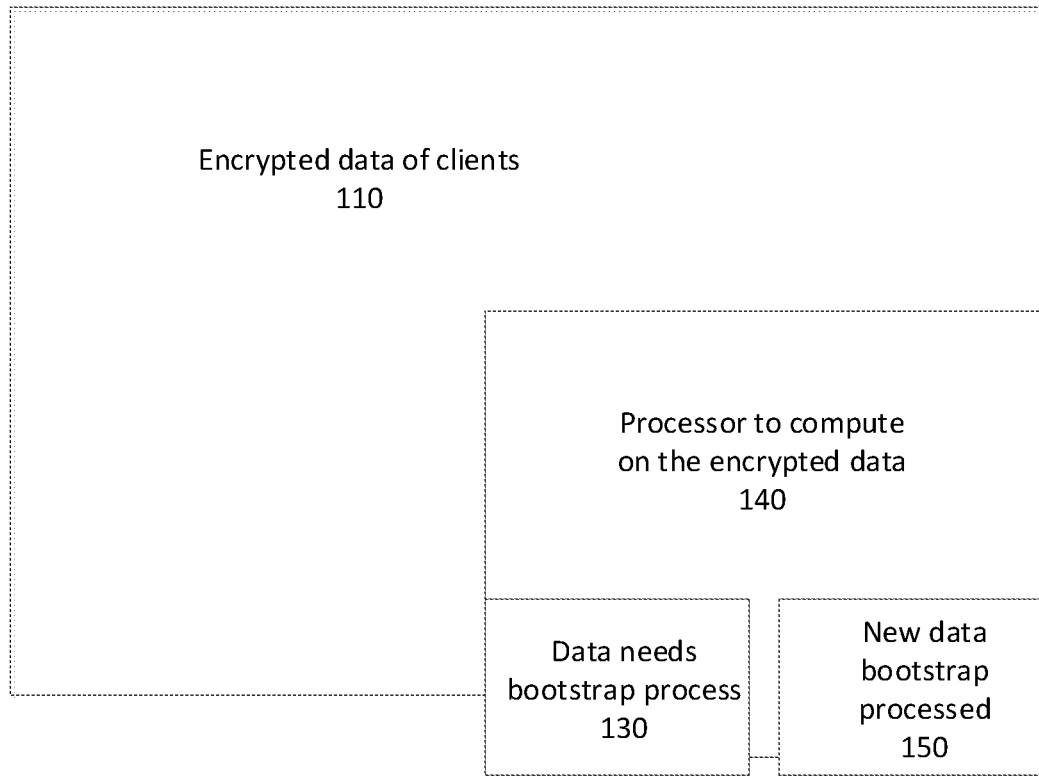

HYBRID FULLY HOMOMORPHIC ENCRYPTION (F.H.E.) SYSTEMS

CROSS-REFERENCE TO RELATED APPLICATIONS

This application is the National Stage of International Patent Application No. PCT/CN2016/075668 filed Mar. 4, 2016, which claims priority from U.S. Provisional Patent Application No. 62/130,543 filed Mar. 9, 2015, the disclosures of each of which are incorporated herein by reference in their entirety.

BACKGROUND

This invention is related to the construction of efficient homomorphic encryption systems, in particular, fully homomorphic encryption, where any computation can be performed on encrypted data to protect the secrecy and the privacy of the data.

In our modern information systems, users often have their data stored and managed on large servers or clouds, which they do not have real control, for example, users may store their data in an Amazon cloud. However from the perspective of the users, the secrecy and the privacy of the data becomes a serious concern, since the server has the full control of the data.

One solution to this problem is that the users instead encrypt their data using a symmetric cryptosystem like AES with their own keys and store it in a cloud such that only each user can decrypt the data with their own keys. However this present another problem in the sense that the users can not make full use of the advantage of the powerful computing power to process the data since for a usual encryption like AES we can not perform meaningful operation on encrypted data. This diminishes tremendously the advantage of using the clouds.

Homomorphic encryption is a type of encryption scheme which allows computations over the encrypted data, namely the ciphertext, and derive an encrypted result when decrypted, gives result of computations performed over the plaintext. The feature is very suitable for privacy protection and for cloud computing.

The power of fully homomorphic encryption was recognized within a year of the development of RSA and there are efficient (partially) homomorphic systems, where only certain type of computations on the encrypted data like addition (only) can be performed on the encrypted data.

An idea solution to the problem is to use what is called fully homomorphic encryption (FHE) systems, where any computation can be performed on the encrypted data. Theoretically speaking, a cryptosystem which supports both addition and multiplication on encrypted data is a fully homomorphic encryption (FHE). FHE allows programs to run on encryptions of their inputs to produce an encryption of their output. Since such a program never decrypts its input, therefore it can be run by an untrusted third party without revealing any information on the processed information.

But only after 30 years of the initial suggestion of the idea of homomorphic encryption, recently a number of FHE systems are proposed. The first one was proposed by Craig Gentry in 2009. Craig Gentry used lattice cryptography to build the first FHE system.

Theoretically Gentry's system can provide evaluations of arbitrary depth circuits (any algebraic computations), but his construction starts from a somewhat homomorphic encryption scheme with a limit on essentially the degree of polynomials that can be computed over encrypted data. Then he built a technique called bootstrap, which is essentially to actually evaluate its own decryption circuit, to build a fully homomorphic encryption. But this step is very costly practically and therefore the systems is not efficient.

There are different variants of Gentry's scheme with smaller key and ciphertext sizes, but still not practical.

There are constructions based on Integers, Learning With Errors problems (LWE) and Ring Learning with Errors problems (RLWE), which are more efficient but again they require bootstrap and the systems are not efficient and not practical.

BRIEF SUMMARY OF THE INVENTION

In this invention, we propose a new paradigm to deal with such a problem using secure hardware or other form of secure elements (SE).

There are already suggestion to use hardware security to achieve the protection of data in cloud while still can perform computations. But in this case, it has a very high demand on the hardware and therefore can be very costly. One such suggestion is by Ken Eguro and Ramarathnam Venkatesan of Microsoft (FPGAS FOR TRUSTED CLOUD COMPUTING).

In our new proposal, we suggest a totally new paradigm, namely we propose a hybrid approach. We combine both the idea of hardware security with the HFE.

We propose to add a secure and efficient bootstrap module to a FHE, which are based either on hardware to other form of secure elements (SE), to the system to perform the function of the bootstrap step, but we will not use the bootstrap computations, but rather we use the secret key of the users to perform the decryption and then re-encrypt the data as the out-put.

In our case, this step must be performed in a secure hardware or other from of secure elements, where the secret key of the user must be fully protected.

Our usage of hardware is very different from another direction of usage of hardware, namely there are lots of efforts to develop hardware to speed the bootstrap computations itself, but we use direct decryption and re-encryption to efficiently perform the function of bootstrap.

BRIEF DESCRIPTION OF THE DRAWINGS

In the drawings:

FIG. 1. Illustrates a cloud server environment in accordance with embodiments discussed herein.

DETAILED DESCRIPTION OF THE INVENTION 1.1 The Basic Idea of FHE and Bootstrap For a FHE system, the data is divided in small blocks of fixed sizes, which we will denoted an $x_i$, $i \in N$, natural numbers. There are addition and multiplication defined on these block, namely we can do addition and multiplication on the blocks: $x_i + x_j$, $x_i \times x_j$.

The system allows each user an encryption function and a decryption function, and the encryption function has a public key P, and we denote this function as $E_P$, and the decryption function has a secret key S, which only the user knows, and we will denote as $D_S$. These two function are very efficient in general.

For any data block, which we also call a plaintext we apply encryption to derive an encrypted block:

$$y_i = E_P(x_i).$$

$y_i$ can have different size from $x_i$.

We also have addition and multiplication on the encrypted blocks: $y_i + y_j$, $y_i \times y_j$. These addition and multiplication in general are not the same as that of the plaintext blocks.

For such an homomorphic encryption system, we in general have the homomorphic property:

$$D_S(y_i + y_j) = x_i + x_j,$$

$$D_S(y_i \times y_j) = x_i \times x_j,$$

in general, for a plaintext $x_i$, there are many ciphertexts, namely there are other $y' \neq y_i$ such that $$D_S(y') = x_i.$$

The reason for the situation above is that the encryption process allows certain errors to be added and as long as the error is within certain range, we will decryption correctly. But if it is out of the limit, the decryption will fail to give the desire results.

The error is enlarged once we start to do computations on the encrypted data $y_i$ and if we do too many operations in particular, multiplications, the error will be out of control.

Bootstrap is a solution to this problem, and it is essentially to evaluate its own decryption circuit. What is does is to refresh the ciphertext so that the error refreshed to the original level. We denote this function as $B_S$: $B_s(y'')$ will be decrypted to the same plaintext but it should has the same level of error terms as y)i and should have much smaller error term than y".

To have a true FHE, we must have $B_S$, it is difficult to implement and it is very inefficient. This is one of the main reasons why we could use the FHE in cloud computing in large scale yet.

1.3 A Hybrid FHE Construction

We have a cloud server 100 and a client using this server. As we described above, the client first encrypt all it data $x_i$ using it own public key (or it can keep it private) and its encryption functions $E_P$: $y_i = E_P(x_i)$.

Then the client will put the encrypted data 110, $y_i$, on the cloud.

In addition, the client can provide a secure hardware 120, which serves as a bootstrap machine, name, this hardware has only one function, given any input, it will decrypt it using $D_S$ and then it will re-encrypt it using $E_P$ and give the output as a the re-encrypted message.

This secure hardware 120 allows one functionality only given input and give an output, nothing else. We will denote this function as $RE_S$.

Then the client will provide this hardware to the cloud and it will be integrated in the cloud server 100, but this device will be kept in a very secure area in the cloud server.

The key point of the hybrid system is that when the cloud server 100 needs to do any computation on the encrypted data in the cloud, and when they need do a bootstrap step to perform the function $B_K$ in the original FHE, they will just call this new hardware to do the computation of $RE_S$ 150. This will solve the problem of efficiency of bootstrap.

When the client or anyone wants to compute the value of any algebraic function $f(x_1, \ldots, x_N)$ for any fixed integer N, it will give the function $f(x_1, \ldots, x_N)$ to the cloud server 100, and the cloud server will compute $f(y_1, \ldots, y_N)$ 140 using the homomorphic property of $E_P$, in addition, during this process whenever there is a need of using the function $B_S$ in the original FHE 130, the server will call the secure module 120 to apply the function $RE_S$ to perform the re-encryption and refresh the errors to the original level from encryption by using $E_P$.

When the client or anyone wants to compute the value of any algebraic function $f(x_1, \ldots, x_N)$ for any fixed integer N, it will give the function $f(x_1, \ldots, x_N)$ to the cloud server, and the cloud server will compute $f(y_1, \ldots, y_N)$ using the homomorphic property of $E_P$, in addition, during this process whenever there is a need of using the function $B_S$ in the original FHE, the server will call the secure module to apply the function $RE_S$ to perform the re-encryption and refresh the errors to the original level from encryption by using $E_P$.

When this result of $f(y_1, \ldots, y_N)$ is derived, it will be sent to the client, who can decrypt it if the client wants to, or ignore it if it does not want to.

The advantage compared to the system supported by hardware is that here we only need to protect a small piece of hardware to be secure not a large systems, and therefore it is will be very costly effective.

We will use all (or some) tools to make this hardware secure to protect secrecy of $D_S$ and S, which include:
  (1) it has a power supply to protect it from tempering and if any tempering is detect, it will wipe out the whole program;
  (2) it has a temper detection circuit to send out warning to the client and the cloud server;
  (3) the secret keys are impossible to find even if some gets hold of the hardware module.

This hardware is small since the decryption is very easy and it is fast. Therefore it is of low cost and it is easy to make it secure since it is a small device.

We can also keep this hardware at the client site but it has a fast connection to the cloud server and the client allows the cloud server fast access to this module of the functionality of $RE_S$.

This secure hardware can be part of the service provided and even controlled by the cloud server. Again, the advantage is that we only need to protect a small piece hardware not a large system, therefore it is very practical.

We can also use other form of secure elements like TrustZone etc to implement the function $RE_S$, as long it is secure and of low cost.

We can also replace the secure hardware module with a secure software either in the white-box form or in an obfuscated software, where the decryption part (or the key) are fully protected.

Our construction can be illustrated in the FIGURE below.

LITERATURE CITED

Craig Gentry, Fully homomorphic encryption using ideal lattices, Symposium on the Theory of Computing (STOC), 2009, pp. 169-178.
Z. Brakerski and V. Vaikuntanathan. Efficient Fully Homomorphic Encryption from (Standard) LWE. In FOCS 2011 (IEEE)
Marten, van Dijk; Gentry, Craig; Halevi, Shai; Vinod, Vaikuntanathan. "Fully Homomorphic Encryption over the Integers". EUROCRYPT 2010 (Springer).
Zvika Brakerski and Vinod Vaikuntanathan Fully Homomorphic Encryption from Ring-LWE and Security for Key Dependent Messages CRYPTO 2011.
Ken Eguro and Ramarathnam Venkatesan, FPGAs for Trusted Cloud Computing, in International Conference on Field-Programmable Logic and Applications, IEEE, August 2012.

The invention claimed is:

1. A method for operating a hybrid fully homomorphic encryption (FHE) system, the hybrid FHE system comprising a user or client, a cloud server or similar server, a secure hardware module associated with the user or client, an encryption function ($E_P$) having a public key P, and a decryption function ($D_S$) having a secret key, S, stored on the secure hardware module and known only by the user or client,
   wherein the secure hardware module is a tamper-proof device, independent from the cloud server or similar server, and configured to evaluate a decryption circuit by at least:
   (i) refreshing a ciphertext to reduce error to an original level when the ciphertext is decrypted with the secret key S to derive a plaintext, and
   (ii) the plaintext is re-encrypted by the encryption function EP directly to derive a new ciphertext,
the method for operating the hybrid FHE system comprising:
   encrypting, at the user or client, a plurality of data blocks, $x_i$, to generate encrypted data blocks, $y_i$, i being natural numbers, using a public or private key and encryption functions $E_P$: $y_i = E_P(x_i)$;
   storing the encrypted data blocks $y_i$ in the cloud server or similar server;
   the user or client providing the encryption function $E_P$ to the cloud server or similar server;
   in response to a request by the user or client to compute a value of algebraic function $f(x1, \ldots, x_N)$ for any fixed integer N, calling the cloud server or similar server to compute $f(y1, \ldots, y_N)$ on the encrypted data using the homomorphic property of $E_P$;
   when computing $f(y1, \ldots, y_N)$, determining, at the cloud server or similar server a need to perform re-encryption and refresh errors to the original level arising from using $E_P$;
   calling the secure hardware module to perform the re-encryption, using a re-encryption function ($RE_S$) which decrypts input from the cloud server or similar server using $D_S$ and the secret key S, and re-encrypts the decrypted input using $E_P$ to generate re-encrypted data;
   provide the re-encrypted data to the cloud server or similar server as a re-encrypted message; and
   sending the re-encrypted message to the user or client to determine whether to decrypt the result.

2. The method of claim 1, wherein the hybrid fully homomorphic encryption (FHE) system comprises both the client and the cloud server.

3. The method of claim 1, wherein the secure hardware module performs only one function $RE_S$ to perform the re-encryption and refresh the errors to the original level arising from using $E_P$.

4. The method of claim 1, wherein the user or client provides the secure hardware module, or the user or client configures the secure hardware module with the secret key and provides the configured secure hardware module to the cloud server operator to be securely integrated in the cloud server.

5. The method of claim 1, further comprising, protecting a secrecy of the function $D_S$ and the secret key S using the secure hardware module, wherein the secure hardware module comprises:
   a power supply to wipe out programming of the secure hardware module if any tampering is detected; and
   a tamper detection circuit to warn the client and the cloud server of any tampering.

6. The method of claim 1, wherein the secure hardware module is kept at the client site and has a fast connection to the cloud server to allow the cloud server fast access the function $RE_S$ in the secure hardware module.

7. The method of claim 1, wherein the cloud server further comprises special hardware to securely implement $RE_S$ and to maintain security of the function $D_S$ and the secret key S so that the secure hardware module is a part of the service provided and controlled by the cloud server as long as the user or client trusts the cloud server to maintain the secrecy of the function $D_S$ and the secret key S.

8. The method of claim 1, wherein the clients or servers can also use other secure elements to implement the function $RE_S$.

9. The method of claim 1, wherein the clients or servers replace the secure hardware module with a secure software either in the white-box form or in an obfuscated software, where the decryption part (or the key) are fully protected.

10. The method of claim 1, wherein the secure hardware module is controlled or built by at least one of the server and the client based on the client.

* * * * *